United States Patent [19]
Roberts

[11] Patent Number: 5,150,838
[45] Date of Patent: Sep. 29, 1992

[54] LAWN SPRINKLER SYSTEM

[76] Inventor: Donel L. Roberts, 1301 Slaughter La., Austin, Tex. 78748

[21] Appl. No.: 509,324

[22] Filed: Apr. 13, 1990

[51] Int. Cl.⁵ .................. B05B 15/06; A01G 25/00; F16L 11/10; F16L 55/02
[52] U.S. Cl. .................. 239/201; 239/269; 239/588; 285/423
[58] Field of Search .............. 239/200, 201, 203, 204, 239/269, 588; 285/179, 390, 423; 405/37, 39, 40, 41; 138/178

[56] References Cited

U.S. PATENT DOCUMENTS

| | | | |
|---|---|---|---|
| 1,337,744 | 4/1920 | Ballerstedt | 239/203 |
| 1,710,888 | 4/1929 | Munz | 239/204 |
| 2,706,134 | 4/1955 | Wilson et al. | 239/269 X |
| 3,759,445 | 9/1973 | King | 239/588 |
| 4,179,142 | 12/1979 | Schopp | 285/390 X |
| 4,314,717 | 2/1982 | Bjurman | 239/588 X |
| 4,410,281 | 10/1983 | Crookes | 138/178 X |
| 4,906,131 | 3/1990 | Savoka | 239/201 X |
| 5,039,011 | 8/1991 | Parker | 239/201 X |
| 5,040,729 | 8/1991 | Carrozza | 239/201 |

*Primary Examiner*—Andres Kashnikow
*Assistant Examiner*—William Grant
*Attorney, Agent, or Firm*—James F. Duffy

[57] ABSTRACT

An improved method for installing lawn sprinkler systems wherein a flexible interconnection line is inserted between the sprinkler head and the water supply line. The flexible interconnection line is preformed having a bend at each end thereof, the bends being orthogonal to each other and to the axis of the interconnection here. This arrangement of bends at the end of a flexible section permits the flexible section to be maintained in close parallel relationship to the water supply line to minimize the width of the trench which must be dug for emplacement of the water supply line beneath the surface of the ground. The preformed interconnection line is also provided with preformed threads at the end so that threaded coupling may be readily made to the water supply line as well as the sprinkler head. This arrangement of threaded coupling permits ready replacement of parts should damage ever occur in the line.

7 Claims, 1 Drawing Sheet

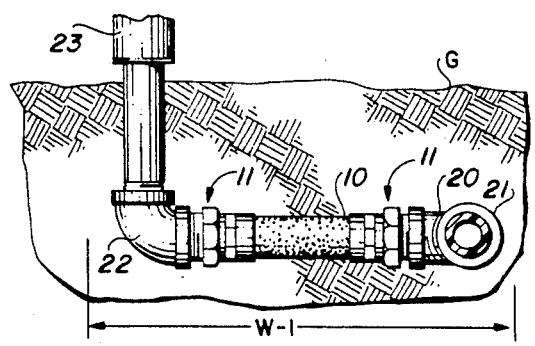
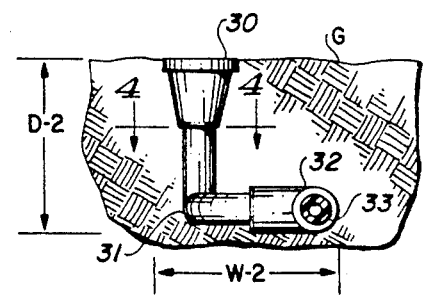
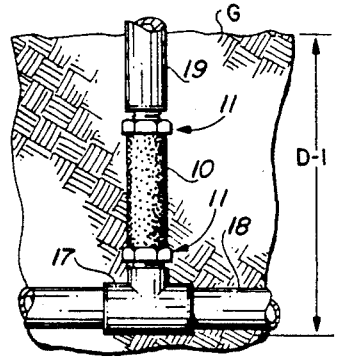
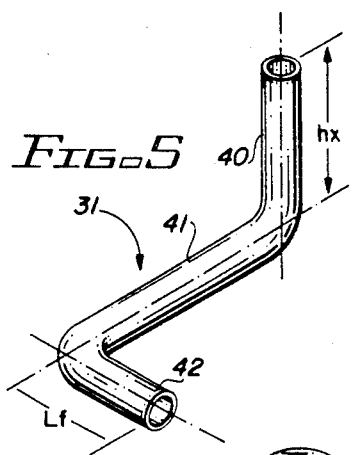
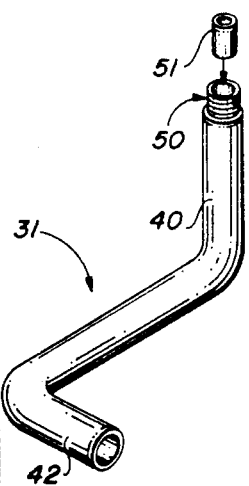
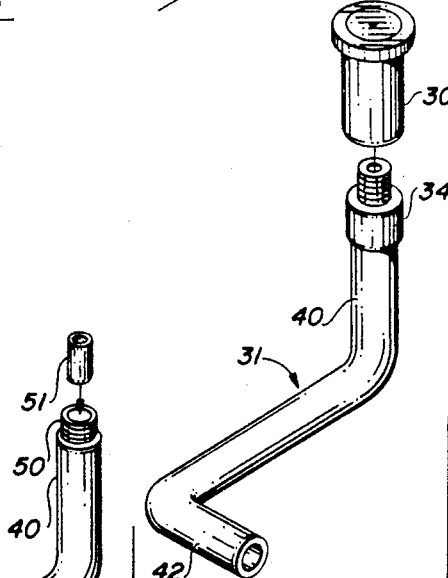
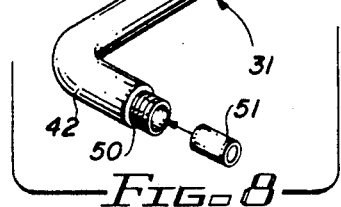
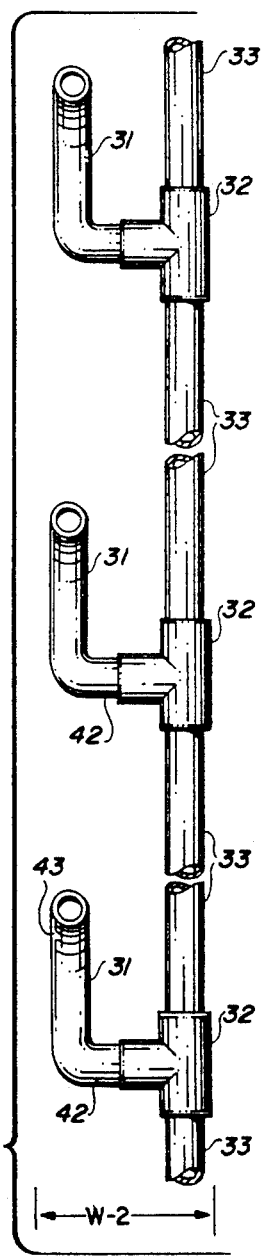

LAWN SPRINKLER SYSTEM

BACKGROUND

1. Field of the Invention

The invention relates to improvements in the underground piping employed with lawn sprinkler systems. In particular, the invention relates to the interconnecting line coupling the spinkler head to the water supply line. In particular, the invention relates to the use of a performed flexible interconnection line which provides a flexible coupling between sprinkler head and the water supply line and is shaped such that the ditching required to incorporate the piping within the ground will be of minimal width and depth.

2. Prior Art

Lawn sprinkler systems generally comprise an underground water supply line to which sprinkler heads are connected by means of nipples or risers. Preferably, only the upper surface of the sprinkler head will rise to or slightly above the surface of the ground in which the sprinkler system is installed. When lawn maintenance equipment passes over, and makes contact with, the sprinkler heads a downward force is directed through the spinkler head and riser to the water supply line. In addition, over a period of time environmental effects, temperature variations and precipitation, will cause the sprinkler heads to rise upward above the surface of the ground where they become subject to the affects of shocking lateral forces such as might occur when stubbed by a person's foot.

In any event, forces applied to the sprinkler head are transferred through the nipple to the water supply line. As a result, damage is frequently encountered either at the junction of the sprinkler head to the nipple, the nipple with the supply line or the nipple itself. To reduce the effects of such shock caused damage, the prior art has resorted to the use of flexible nipples. In general, these nipples consist of a length of flexible line having threaded connectors at each end. When such a flexible nipple is utilized, it is, of course, necessary that the flexible section be of sufficient length to allow the nipple to flex under stress. Because of the necessary length to permit flexure, the flexible nipple imposes adverse dimensional changes on the trench which must be dug into the earth in order to install the water supply line. If the flexible nipple extends outwardly to the side of the water supply line, the trench must be increased in width over that of a lawn sprinkling system utilizing a short but rigid nipple. If the flexible nipple rises vertically from the water supply line, the trench must be dug deeper than that which is necessary when short but rigid nipples are employed.

Examples of such flexible nipples as found in the prior art are disclosed by King in U.S. Pat. No. 3,759,445, issued Sep. 18 1973; and in the U.S. Patent issued to Bjurman, U.S. Pat. No. 4,314,717, Feb. 9, 1982.

It is an object of the present invention to provide a preformed, flexible line to be used as a nipple or interconnector between lawn sprinkler head and water supply line. However, the invention will impose no adverse dimensional requirements on the trenching employed in installing a lawn sprinkler system utilizing the invention.

It is further objective of the invention to eliminate the necessity of expending money and labor to purchase and install threaded couplings on the flexible, preformed interconnection line.

SUMMARY OF THE INVENTION

In one aspect, the invention is disclosed as an improvement in a lawn sprinkler system, the system having a water supply line, a sprinkler head, and a length of flexible line connecting the sprinkler head to the water supply line. In the improved system, the flexible line is a preformed flexible line which has a first and a second end section and a central section. The first end section as well as the central section lie in a first plane and they define a first 90° bend in the preformed flexible line. Similarly, the second end section and the central section lie in a second plane and they define a second 90° bend in the preformed flexible line. The first and the second planes just noted are generally orthogonal to each other.

When the invention is employed in a lawn sprinkler system, the first end section of the preformed flexible line is coupled to the supply line. Because of the bend in the first end section, the central section will lie adjacent to and proximate to the supply line. At the same time, the second end section will be positioned for coupling to the sprinkler head, the sprinkler head being then in a position to extend upward toward ground surface.

In the improved flexible line interconnection just defined, the first end section may have a selected fixed length which determines the proximity of the central section from the supply line when coupled to that supply line. On the other hand, the second end section may have a somewhat arbitrary length to it. By fabricating the flexible interconnection line to have its second end section longer than is anticipated, the length of that section may be cut to the desired size as determined at the work site.

A threaded adapter may be coupled to the preformed flexible line to facilitate connection of the sprinkler head to the supply line via the flexible line. However, the invention conceives of preforming the interconnection line with threads preformed thereon to facilitate connecting the sprinkler to the supply line without the need to expend money and labor to purchase and install threaded couplings.

To prevent the flexible line from distorting at the end with the preformed threads, when the line is subject to stress, a short length of stiffening tubing is captively inserted into the end of the preformed flexible line. This stiffens the threaded end of the flexible line and inhibits the removal of a threaded coupling from the preformed threads when a tensile stress is applied. The use of a stiffening tube inserted into the end of the flexible line is not disclosed as a limitation upon the method to be employed in stiffening the threaded end of the flexible line, but rather, as one example by which such stiffening may be achieved. A satisfactory material for use in the preformed flexible line is polyvinylchloride pipe, commonly referred to as PVC pipe.

The invention may be disclosed in a second aspect as an interconnection line for the transfer of fluids. The interconnection line is seen to comprise a preformed flexible line which has an axis and first and second ends. There is a bend in the line at each of the first and second ends. The bend at the first end and the bend at the second end are orthogonal to the axis of the flexible line as well as to each other. If two orthogonal planes are defined, the bend at the first end of the flexible line is seen to lie in the first plane and the axis of the flexible line lies along the intersection of the two orthogonal planes. The bend at the second end of the flexible line lies in the second plane.

Stated in another way, the bend at the first end of the line is to the right or the left while the bend at the second end of the line is up or down. The flexible interconnection line has preformed threads on it. A stiffening tube is captively inserted into the end of the tube having the preformed threads to stiffen the flexible line at the end having the preformed threads.

DESCRIPTION OF THE DRAWINGS

FIG. 1 illustrates the prior art installation of a flexible nipple requiring an extra wide trench.

FIG. 2 shows the prior art use of a flexible nipple and requiring the use of an extra deep trench.

FIG. 3 represents the use of the flexible interconnection line of the invention which permits use of a trench with minimal width and depth dimensions.

FIG. 4 is a view of the underground piping installation taken along the line 4—4 of FIG. 3, and showing the use of the preformed flexible interconnection line of the invention.

FIG. 5 illustrates the invention comprising a preformed flexible interconnection line having two orthogonal bends.

FIG. 6 illustrates the flexible interconnection line with a threaded adapter coupled to one end thereof in anticipation of threaded coupling with a sprinkler head.

FIG. 7 illustrates the preformed flexible interconnection line having preformed threads at one end thereof and a stiffening tube for insertion into the flexible line to stiffen the end of the line at the pre-threaded end.

FIG. 8 illustrates the flexible interconnection line having both ends with preformed threads and utilizing stiffening tubes at each end.

A DETAILED DESCRIPTION OF THE INVENTION

For purposes of promoting an understanding of the principles of the invention, reference will now be made to the embodiments illustrated in the drawings and specific language will be used to describe same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

FIGS. 1 and 2 illustrate the prior art taught by King in the U.S. patent noted earlier. The prior art, as exemplified by King in FIGS. 1 and 2, consists of an elongated flexible section 10 having threaded connectors 11 at each end thereof. In FIG. 1, a water supply line 21 is provided with tees 20. The flexible section 10 is thread coupled by means of coupling 11 to tee 20. Line 21 and flexible nipple 10 lie generally parallel to the surface of ground G. An elbow 22 is thread coupled to the other end of flexible section 10 by means of threaded connector 11 and is thread coupled to a riser 19 which connects with sprinkler head 23. In FIG. 1 is noted the width W-1 required of a trench in which water supply line 21, flexible section 10, and riser 19 must be embedded. Because of the necessity that section 10 have sufficient length to flex, the width W-1 is significantly wider than the trench required by use with short rigid nipples.

FIG. 2 illustrates a water supply line 18 having tees 17 from which connection is made to sprinklers via risers 19. In FIG. 2, flexible section 10 rises vertically toward the ground from water supply 18. Again, because of the significant length required to permit flexure of section 10, the depth D-1 at which the water supply line 18 must be emplaced within a trench is significantly deeper than that which would be required when using conventional, rigid nipples or risers.

FIG. 3 is an illustration analogous to the prior art illustration of FIG. 1. However, in FIG. 3, which utilizes the preformed flexible interconnection line 31 of the invention, the depth requirements D-2 and the width requirements W-2 of the trench required for placement of water supply line 33 are significantly reduced over that of the width W-1 and depth D-1 required by the prior art.

In FIG. 3, the water supply line 33 is provided with tees 32 from which coupling is made to a sprinkler head 30 by means of a preformed, flexible, interconnection line 31. The elevation view of water supply line 33, taken along the line 4—4 of FIG. 3, shows that the preformed, flexible, interconnection line 31 is comprised of a length of flexible line having a pair of orthogonal bends, one at each end of the flexible line. A first bend 42 assures that when flexible line 31 is coupled to tee 32, line 31 will lie in close proximity to water supply line 33 and be positionable generally in a parallel relationship with water supply line 33. When so positioned, the bend 43 points the end of line 31 upwardly towards its connection with sprinkler head 30 which is positioned with its upper surface approximately flush with the surface of the ground G, FIG. 3.

FIG. 5 is a perspective view of the preformed, flexible interconnection line 31. Line 31 is seen to comprise a central section 41 having a bend 40 at a first end thereof and a bend 42 at the second end thereof. Bends 40 and 42 direct line 31 in orthogonal directions. In the basic invention illustrated in FIG. 5, various pipe couplings may be adhesively coupled at either or both ends of line 31. The use of flexible PVC piping has been found to be admirably suited for fabrication of the invention.

Bend 42 has a fixed length Lf. Lf is fixed so as to bring the central section 41 of line 31 into close proximity with water supply line 33 when the end section 42 is coupled to tee 32 on supply line 33. By maintaining line 31 in close parallel approximation to supply line 33, the width W-2 of the trench necessary for embedding supply line 33 will be held to a minimum. As already noted, this minimum width W-2 required by use of the invention is significantly less than the width W-1 required by the prior art. Time and labor are saved when a narrower trench suffices for the installation.

At the bend at end section 40 of flexible pipe 31, illustrated in FIG. 5, an arbitrary length hx is selected. The length hx is arbitrary in that it is deliberately fabricated to be oversize and have a length greater than that anticipated for actual use in installation of sprinkler heads at the work site. Depending upon specifications at which the water supply line must be buried beneath the surface of the ground G, the length hx may be cut to size at the work site so as to bury water supply line at the proper depth and still position the coupled sprinkler head 30 to have its top surface flush with the surface of the ground.

FIG. 6 illustrates the flexible line 31 of FIG. 5 having a threaded adapter coupled at the end of bend 40.

Adapter 34 will thread couple with sprinkler head 30. It is noted that threaded couplers or adapters such as 34 cost the installer on the order of twenty-five cents each and require time spent by a laborer to install the threaded connector to line 31. It was therefore felt appropriate to conceive of a manner in which the use of such piping adapters such as 34 would be avoided altogether.

In the perspective view of FIG. 7, the end section 40 of flexible line 31 has a preformed thread 50. Thread 50 is preformed at the same time line 31 is preformed. Because line 31 is a flexible line, it has been found that a threaded coupler 34 or a sprinkler head 30 thread coupled to preformed threads 50 may be so stressed by a tensile force, applied between end section 40 and the item thread coupled to preformed threads 30, as to separate the threaded coupling and cause the threaded item and line 31 to part.

Since it is economically desirable that both the flexible line and the threaded section be preformed simultaneously, a method for eliminating the potential for the stress separation of line 31 and items thread coupled thereto was sought. The preferred solution is illustrated in FIG. 7 wherein a stiffening tube 51 is captively inserted within the end section 40 of flexible line 31. The length of stiffening tube 51 need be only slightly longer than the length of threads 50. The effect of the insertion of stiffening tube 51 into the end of section 40 of flexible line 31 is to stiffen the threaded end of the line. With stiffening tube 51 in place, it is virtually impossible to separate a threaded coupling of line 31 from a spray head or other threaded fitting under anticipated stress loads. A slim, non-flexible plastic tube will serve as stiffening tube 51.

When end 40 of flexible line 31 is provided with preformed threads 50, the length of the end section 40 is supplied at a selected fixed dimension. Lines 31 having preformed threads on sections 40 may be provided in several bend lengths hx as will meet a variety of typical field requirements.

FIG. 8 is a perspective illustration showing the flexible, preformed line 31 having preformed threads 50 at each end thereof. Again, the use of stiffening tubes 51 is suggested for inhibiting the stress decoupling of flexible line 31 from sprinkler heads 30 or other thread fastened couplings.

What has been disclosed herein is an improved method for installing lawn sprinkler systems wherein a flexible interconnection line is inserted between the sprinkler head and the water supply line. The flexible interconnection line is preformed having a bend at each end thereof, the bends being orthogonal to each other and to the axis of the interconnection here. This arrangement of bends at the end of a flexible section permits the flexible section to be maintained in close parallel relationship to the water supply line to minimize the width of the trench which must be dug for emplacement of the water supply line beneath the surface of the ground. The preformed interconnection line is also provided with preformed threads at the end so that threaded coupling may be readily made to the water supply line as well as to the sprinkler head. This arrangement of threaded coupling permits ready replacement of parts should damage ever occur in the line.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such a clear and concise manner that those skilled in the art may readily understand and practice the invention, that which is claimed is:

1. In a lawn sprinkler system having a water supply line, a sprinkler head, and a length of flexible line connecting said sprinkler head to said water supply line, the improvement comprising:
   said flexible line being a preformed flexible line having a first and a second end section and central section;
   said first end section and said central section lying in a first plane and defining a first 90° bend in said preformed flexible line;
   said second end section and said central section lying in a second plane and defining a second 90° bend in said preformed flexible line; and
   said first and said second planes being generally orthogonal to each other,
   whereby when said first end section of said preformed flexible line is coupled to said supply line, said central section will lie adjacent to and proximate said supply line and said second end section will be positioned for coupling to said sprinkler head.

2. The improvement of claim 1 wherein:
   said first end section has a selected fixed length determinative of the proximity of said central section of said preformed flexible line to said supply line; and
   said second section has a first selected length for cutting to a second, selected, coupling length when said sprinkler is coupled to said second end section.

3. The improvement of claim 1 further comprising a threaded adapter coupled to said preformed flexible line to facilitate connecting said sprinkler head to said supply line.

4. The improvement of claim 1 wherein said preformed flexible line has an end having preformed threads thereon to facilitate connecting said sprinkler head to said supply line.

5. The improvement of claim 4 further comprising a stiffening tube captively inserted within said end of said preformed flexible line which has said preformed threads thereon,
   wherefor said end having said preformed threads is stiffened to inhibit the removal of a threaded coupling from said preformed threads by application of tensile stress to said preformed flexible line and a coupling threaded thereto.

6. The improvement of claim 1 wherein, to facilitate connecting said sprinkler head to said supply line, said preformed flexible line has an end having preformed threads thereon, said end having said preformed threads being generally less flexible than said preformed flexible line to inhibit tensile stress separation of said preformed line from a threaded connector when a threaded connector is coupled to said preformed threads.

7. The improvement of claim 1 wherein said preformed flexible line is comprised of flexible polyvinylchloride pipe.

* * * * *